United States Patent [19]
Rabii

[11] Patent Number: 5,081,532
[45] Date of Patent: Jan. 14, 1992

[54] ADAPTIVE PROGRESSIVE SCAN CONVERTER

[75] Inventor: Khosro Rabii, Arlington Heights, Ill.

[73] Assignee: Zenith Electronics Corporation, Glenview, Ill.

[21] Appl. No.: 575,269

[22] Filed: Aug. 30, 1990

[51] Int. Cl.$^5$ .................. H04N 7/18; H04N 7/01; H04N 7/12

[52] U.S. Cl. .................. 358/105; 358/140; 358/135

[58] Field of Search ............ 358/105, 135, 136, 140, 358/21 R

[56] References Cited

U.S. PATENT DOCUMENTS

| | | | |
|---|---|---|---|
| 4,626,891 | 12/1986 | Achiha | 358/21 R |
| 4,639,773 | 1/1987 | Hurst | 358/105 |
| 4,691,230 | 9/1987 | Kaneko et al. | 358/105 |
| 4,730,217 | 3/1988 | Tonge et al. | 358/160 |
| 4,731,648 | 3/1988 | Bernard et al. | 358/105 |
| 4,733,297 | 3/1988 | Katsumata et al. | 358/105 |
| 4,740,842 | 4/1988 | Annegarn et al. | 358/105 |
| 4,873,575 | 10/1989 | DeHaan | 358/105 |
| 4,941,045 | 7/1990 | Birch | 358/105 |
| 4,987,489 | 1/1991 | Hurley et al. | 358/105 |

Primary Examiner—John K. Peng

[57] ABSTRACT

A video system includes a scan converter for developing a progressively scanned display of video lines from a two field interlaced line system. Three video pixels are simultaneously supplied to a motion detector and a three dimension interpolator, the pixels corresponding to the pixel from the line above and the line below the pixel to be interpolated and to the corresponding pixel from the previous field. A motion coefficient for each interpolated pixel is stored in a field memory and the coefficient determined for the previous field interpolated pixel is consulted in developing motion factors for controlling multipliers in the three dimension interpolator. The interpolated pixel may thus be any porportion of the pixels on the line above, the line below and the previous field. An adaptive peaking and noise coring circuit is included. A spatial array of three lines of pixels, both real and interpolated, is developed and a horizontal, a vertical and two diagonal gradients between pair of pixels in the array are calculated. Logic circuitry and a maximum value decoder determine a peaking factor based upon the maximum gradient. A simplified adjustable noise coring circuit with symmetrical and asymmetrical peaking is also shown.

4 Claims, 9 Drawing Sheets

ADAPTIVE PROGRESSIVE SCAN CONVERTER

CROSS REFERENCE TO RELATED PATENT APPLICATIONS

This application is related to application Ser. No. 349,192, filed May 9, 1989, entitled 2H COMB with SPATIAL MIXING abandoned and application Ser. No. 395,006, filed Aug. 17, 1989, now U.S. Pat. No. 5,016,103, issued May 14, 1991, entitled SPATIAL SCAN CONVERTER WITH VERTICAL DETAIL ENHANCEMENT, both in the names of K. Rabii, and both assigned to Zenith Electronics Corporation. The application also discloses subject matter claimed in the following copending applications of the inventor, Ser. No. 550,605, filed Jul. 10, 1990, entitled LINE INTERPOLATOR WITH PRESERVATION OF DIAGONAL RESOLUTION; Ser. No. 549,869, filed Jul. 9, 1990, entitled ADAPTIVE PEAKING CIRCUIT; and Ser. No. 549,867, filed Jul. 9, 1990, now U.S. Pat. No. 5,031,042, issued Jul. 9, 1991, entitled NOISE CORING AND PEAKING CIRCUIT.

BACKGROUND OF THE INVENTION AND PRIOR ART

This invention relates generally to video signal processing systems and particularly to NTSC type television video signal processing systems.

As is well known, NTSC television signals are prone to a number of distortions including artifacts such as hanging dots, dot crawl, color contamination, highly visible noise in low frequency signal areas of the video display, a visible line structure due to line interlacing and the loss of vertical and horizontal picture detail because of restricted bandwidth. All of the above have been addressed by the prior art in different ways. For example, line comb filters are often used to derive the video and chroma signal components by adding and subtracting adjacent lines of video. This can eliminate cross contamination of the chroma signal into the luma signal and vice versa and enables a wider bandwidth luma signal to be processed. Comb filtering works well to minimize noise and "crosstalk" except in the presence of video variations which give rise to other well-known problems. In the copending application Ser. No. 349,192, an arrangement for determining when to comb filter and how much to comb filter, i.e. whether and how much to comb the two upper lines of a three line display area, the two lower lines, all three lines or whether to "simple decode" the signal is determined by developing gradients between selected pixels in a spatial area that embraces all three video lines. A processing decision for each pixel is made based upon the developed differences. The final processing decision may be modified by reference to processing decisions made for previous pixels in the spatial area and for decisions that the system indicates should be made for subsequent pixels in the spatial area. With that more precise decision making arrangement, combing is done only when it will be of benefit to the video display and avoided when it may introduce objectionable artifacts or otherwise detract from the video display.

The prior art also discloses many techniques for peaking the video signals, i.e. sharpening the signal transitions to give the impression of a wider bandwidth. Because of the subjective nature of video displays and signal peaking, there are many algorithms for determining when a signal should be peaked and the degree to which it should be peaked. Signal peaking circuits are also frequently used in conjunction with so-called "noise coring" circuits which essentially core the signal, i.e., provide a range of signal levels for which no peaking is performed. The purpose is to avoid emphasizing visible noise in a signal.

The interlaced scanning arrangement of an NTSC signal produces two alternating fields having interleaved lines of video. Consequently, each line of pixels in the display is illuminated only fifty percent of the time, i.e. during one of the two alternating fields. This results in a visible line structure which is disconcerting to viewers. The line structure is especially objectionable in receivers and monitors having large display areas, i.e. large screen and projection type television receivers and video monitors. Many arrangements have been developed for converting an interlaced scan system to a progressive scan system, where each line of pixels is scanned (illuminated) in each field, thus eliminating the visible line structure. This is generally accomplished by scanning the display at twice the normal rate and interspersing interpolated lines of video between each pair of real video lines. Commonly, the interpolated lines of video are developed by averaging the video in each successive pair of video lines or by repeating each real line of video. Copending application Ser. No. 349,192 mentioned above, discloses a progressive scan converter that averages successive lines of real video to develop the interpolated lines of video and also enhances the vertical detail between the real lines of video.

This invention is directed to an adaptive progressive scan converter that develops the interpolated pixels or line as a function of motion that is detected in the scene. Also disclosed is the adaptive peaking circuit of application Ser. No. 549,869 and the noise coring arrangement of U.S. Pat. No. 5031042, both of which cooperate with the present invention to yield an improved video display.

OBJECTS OF THE INVENTION

A principal object of the invention is to provide an improved video processing circuit.

A further object of the invention is to provide a novel video processing system that includes an improved scan converter.

A still further object of the invention is to provide a novel video processing system that includes an improved scan converter that interpolates video as a function of detected motion in the video.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

Figure 1:
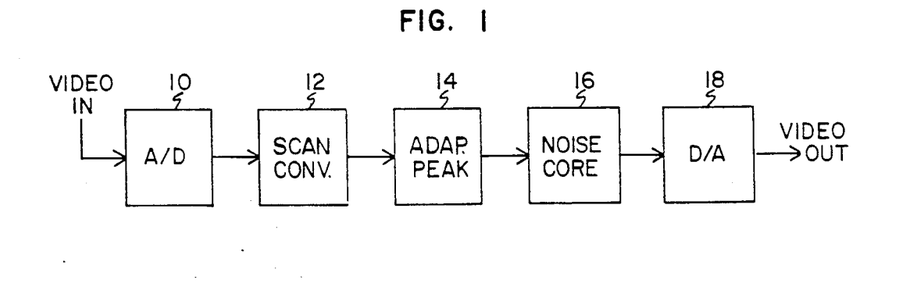
FIG. 1 represents a simplified block diagram of the inventive video processing system.

FIG. 1 shows a simplified block diagram of a video processing system constructed in accordance with the present invention. An analog source of video input (not shown) is supplied to an analog to digital (A/D) converter 10 where the signal is sampled and digitized and reproduced in digital form in a well known manner. The output of A/D converter 10 is applied from the A/D converter to a scan converter 12 where, as will be explained, the two interlaced field signals are converted to a progressive line scan signal. The scan converter supplies an adaptive peaking circuit 14, which is identical to that disclosed and claimed in application Ser. No. 549,869 above. The output of adaptive peaking circuit 14 is coupled to a noise coring circuit 16 which is disclosed and claimed in U.S. Pat. No. 5031042 above. The output of noise coring circuit 16 is supplied to a digital to analog (D/A) converter 18 which produces the analog video output signal.

Figure 2:
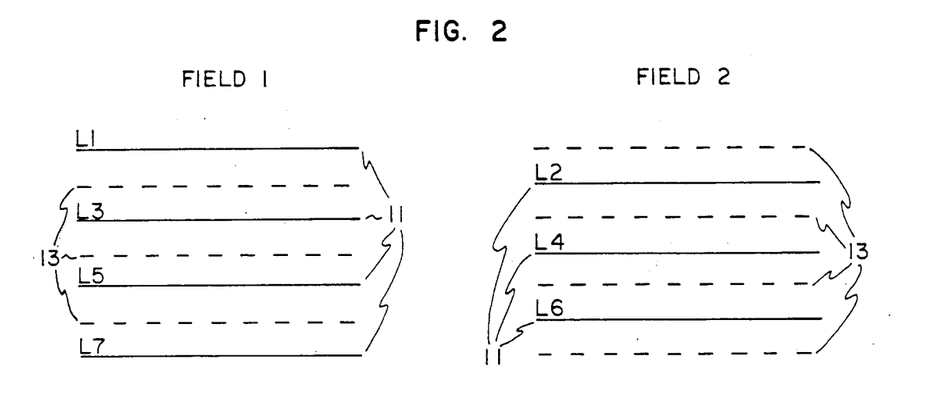
FIG. 2 depicts the arrangement of lines in two interlaced fields of video.

In FIG. 2, two interlaced fields of video are identified as field 1 and field 2 with the solid lines 11 in each field representing real video lines and the dashed lines 13 in each field representing interpolated video lines. The arrangement of the lines as they appear in the display is L1, L2, L3, etc. The interpolated video lines in some prior art systems are developed by summing pairs of successive video lines and dividing by two. In other progressive scan systems, the interpolated video lines are provided by repeating the real lines. The end result is to display twice the number of video lines with alternate lines being interpolated. Such progressive scan systems, as is well known, eliminate the visible line interlace structure.

The system of the present invention, in recognition of the fact that most video tends to be static, provides an improved progressive scan converter display by mixing both temporally and spatially processed video information for developing the interpolated video lines. The system utilizes a motion detector means to determine the amount of motion in the video information and, if a low or a minimal amount of motion is indicated, the corresponding line in the previous field is used as the interpreted video line. If a large amount of motion is detected, the two successive real video lines are averaged to develop the interpreted video line. Further, the system of the invention incorporates a so-called three dimensional (3D) interpolator that is supplied with the two successive real lines and the corresponding real line of the previous field and combines them in portions determined by factors from the motion detecting means.

It will be appreciated that while video lines are referred to, the processing is on a pixel-by-pixel basis. The motion detecting means includes logic circuitry that compares a motion coefficient previously determined for the corresponding pixel in the previous frame with the motion coefficient determined for the pixel being processed for modifying the motion factors that control the 3D interpolator. Thus with the system of the invention, the mixing proportions of the previous field pixel and the successive present field pixels are determined by motion parameters (both present and past). The interpolated video pixel is developed from the mixing process. With the system, the effects of noise in the display are minimized.

Figure 3A:
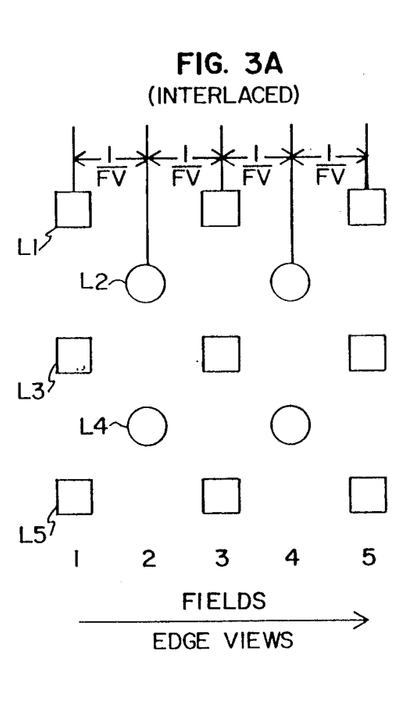
FIGS. 3A-3C represent edge views of a prior art, interlaced display, a spatially processed progressive scan display and a temporally processed progressive scan display, respectively.
Figure 3B:
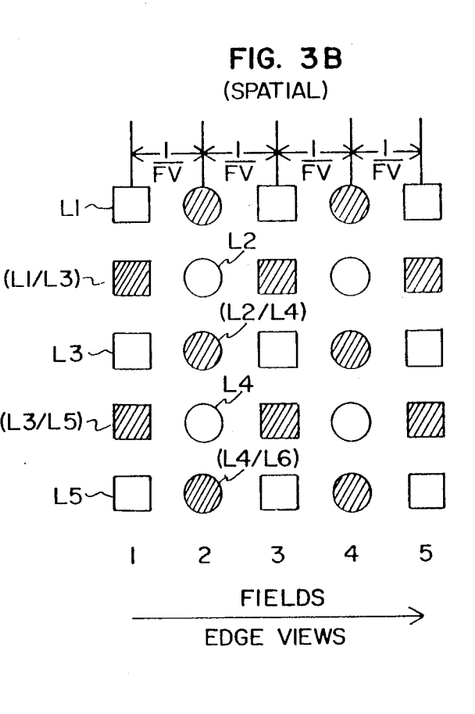
Figure 3C:
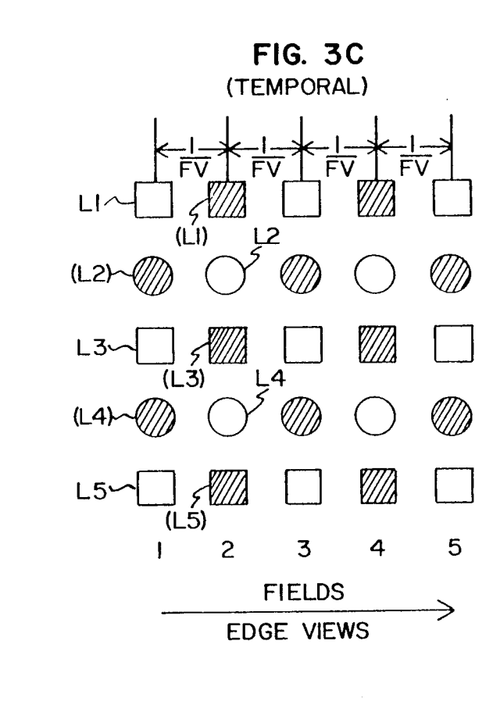

In FIGS. 3A-3C, the basic types of video interpolation are illustrated along with an interlaced display. It should be particularly noted that the figures represent a series of edge views of fields 1-5. Thus lines L1, L3 and L5 (edge views) lie in the plane of a CRT surface. In FIG. 3A, a conventional two line interlaced display is illustrated with lines L1/L3 and L5 being displayed in field 1 and lines L2 and L4 in field 2, etc. As indicated, the fields are delayed by a time period of 1/Fv, which is the vertical timing interval. In FIG. 3B, a spatial interpolation system in a progressive scan converter is shown and field 1 consists of L1, L3, L5, which are indicated as plain squares, interspersed with interpolated video lines (L1/L3) and (L3/L5), which are indicated as cross hatched squares. In the second field, a similar arrangement occurs with the plain circles being L2 and L4 and the cross hatched circles being (L2/L4) and (L4/L6), which are being the average of the indicated lines. In FIG. 3C a temporal system is indicated in which the first field consists of lines L1, L3 and L5 (plain squares) interspersed with interpolated lines corresponding to lines L2 and L4 (cross hatched circles) of the previous field. It should be apparent that the temporal system is capable of superior noise performance since the video information is averaged with more lines of identical video when there is no motion. However in the presence of motion, the temporal system of FIG. 3C would not be advantageous.

Figure 4:
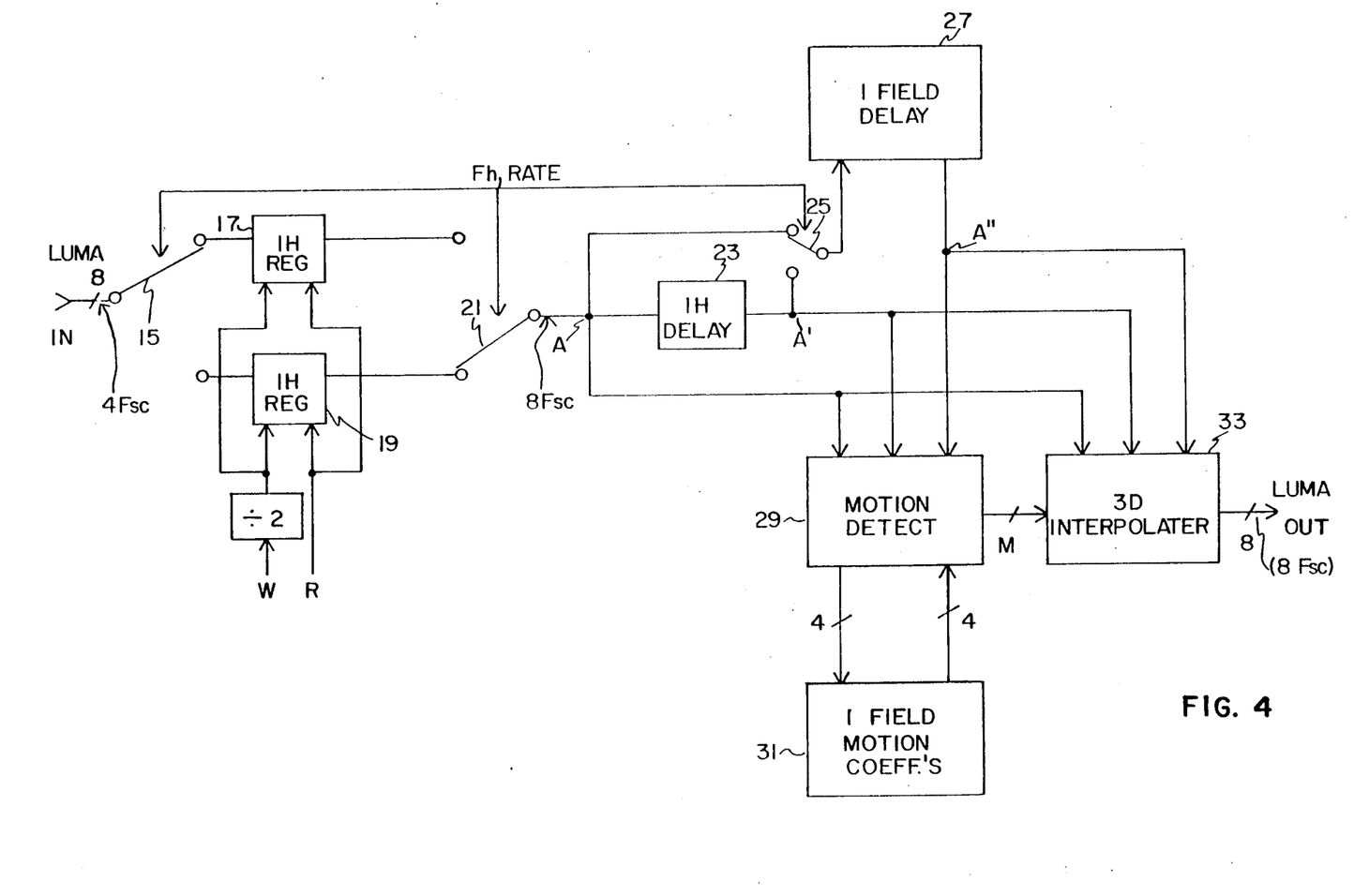
FIG. 4 is a partial block diagram of a spatial pixel interpolater constructed in accordance with the invention.

FIG. 4 indicates a partial block diagram of an arrangement for accomplishing the objects of the invention. An input source of luminance (luma) signal is supplied to a switch 15 that alternates between a pair of one horizontal line (1H) registers 17 and 19 that are written to by W/2 signals and read from by R signals. Thus the registers are read out at twice the rate that they are written to. The outputs of the registers 17 and 19 are coupled to another switch 21 which alternately selects them. The switch 21 is connected to a junction A which is coupled by a 1H delay line 23 to a junction A'. Junction A is coupled to one contact of the switch 25 and junction A' is connected to the other contact of switch 25. The common pole of switch 25 is supplied to a one field delay 27 which produces an output at a junction A". Junctions A, A' and A" are each coupled to a motion detector 29 and to a 3D interpolator 33. Motion detector 29 is in turn intercoupled with a one-previous-field motion coefficient storage device 31. Motion detector 29 supplies a plurality of motion factors K1, K2 and K3 for controlling 3D interpolator 33 based upon logical comparisons of the signals at junctions A, A' and A" and the appropriate one of the previous field motion coefficients stored in storage device 31. The 3D interpolator produces the processed luminance signal as an output. The numbers adjacent the slashed lines at various points about the circuit indicate the number of bits in the digital signal. It should be noted that the input luma signal is at a 4Fsc rate whereas the signal at junction A is at an 8Fsc rate, where 4Fsc equals 4x the color subcarrier frequency or 14.32 MHz. The switches 15, 21 and 25 are operated at an Fh rate, that is at the line frequency. Thus the video signal at the input of switch 15 is supplied twice in succession at the output of switch 21. If one line of video is input, then that line is replicated and appears as two successive lines in the output (at twice the frequency). This is a conventional progressive scan technique. As will be explained below, the output of 3D interpolator 33 consists of one or more of the video pixels (signals) at the junctions A, A' and A'' in proportions that depend upon the motion factors from motion detector 29.

Figure 5:
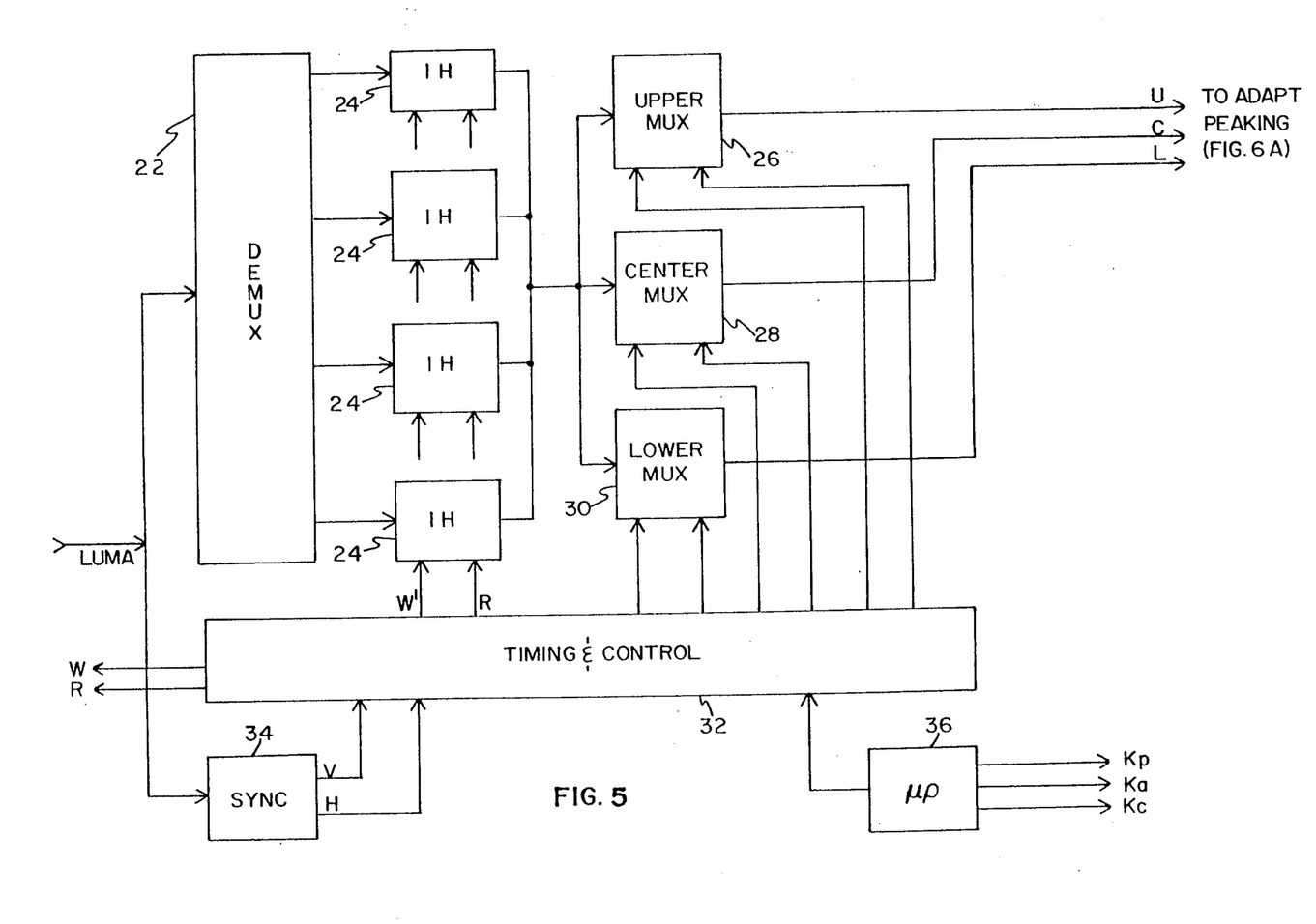
FIG. 5 is a block diagram of the progressive scan converter.

Referring to FIG. 5, luma signal from FIG. 4 is supplied to a demultiplexer 22. A synchronizing signal separator 34 is supplied from a composite video source (not shown). Demultiplexer 22 in turn supplies four-one horizontal line (1H) memories 24 which are controlled by W write (W) and read (R) signals from a timing and control circuit 32 that is supplied with vertical (V) and horizontal (H) timing information from sync separator 34. A microprocessor 36 controls the operation of timing and control circuit 32 and supplies a series of programmable factors Kp, Ka and Kc, as will be described. An upper line (U) multiplexer 26, a center line (C) multiplexer 28 and a lower line (L) multiplexer 30 are each supplied with the outputs of the 1H memories 24 and are controlled by timing and control circuit 32 for developing an upper line, a center line and a lower line of scan converted video pixels. All three lines of video pixels, labelled U, C and L, are supplied to the adaptive peaking circuit in FIG. 6A. It will be appreciated that new lines of video pixels are successively replacing the lines of video pixels in the memories. The successive lines of pixels are written into and read from the 1H memories at a rate of 8Fsc.

Figure 6A:
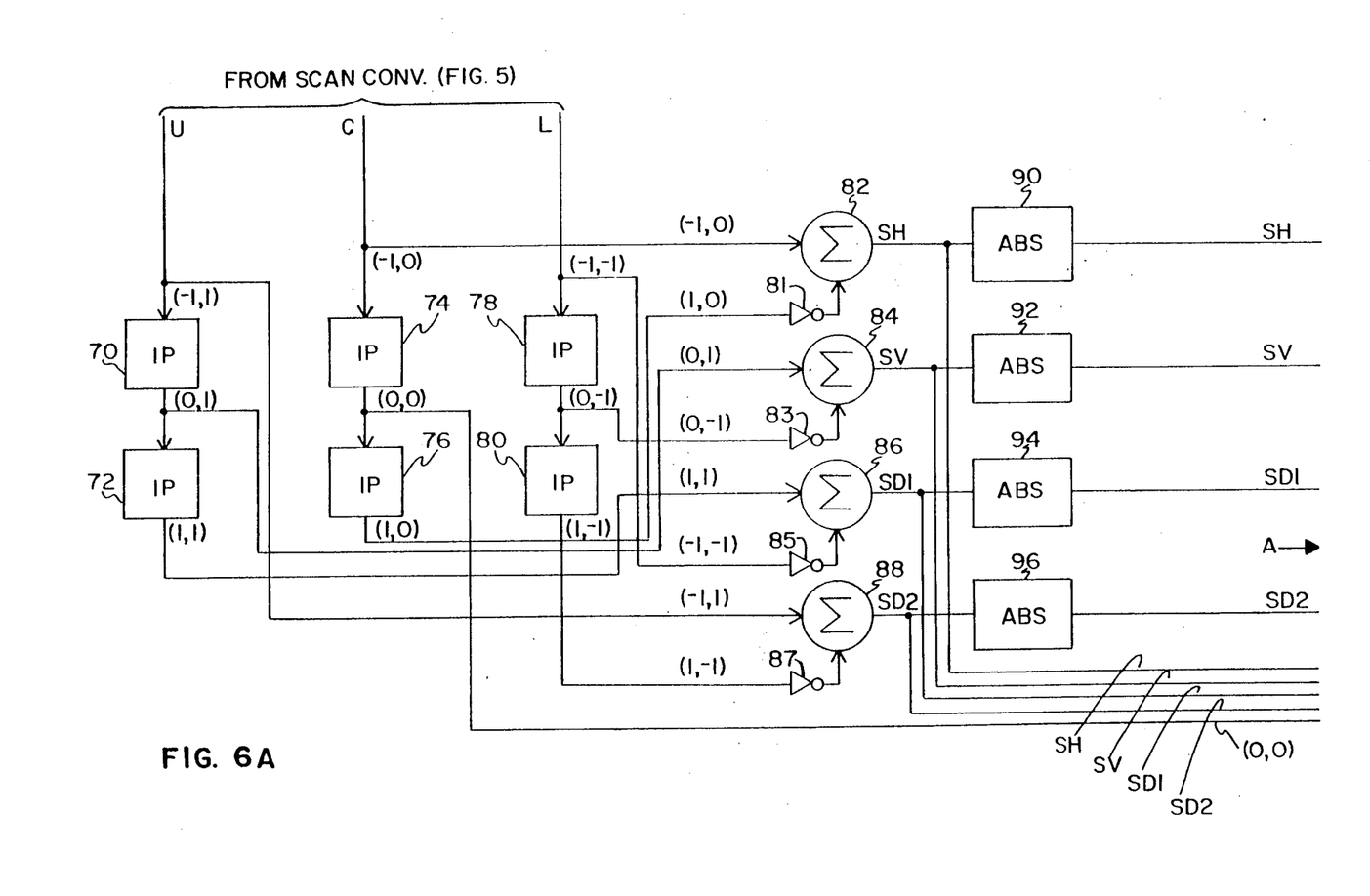
FIGS. 6A, 6B and 6C together form a block diagram of an adaptive peaking circuit, and a noise coring circuit that symmetrically and asymmetrically peaks the peaking component.
Figure 6B:
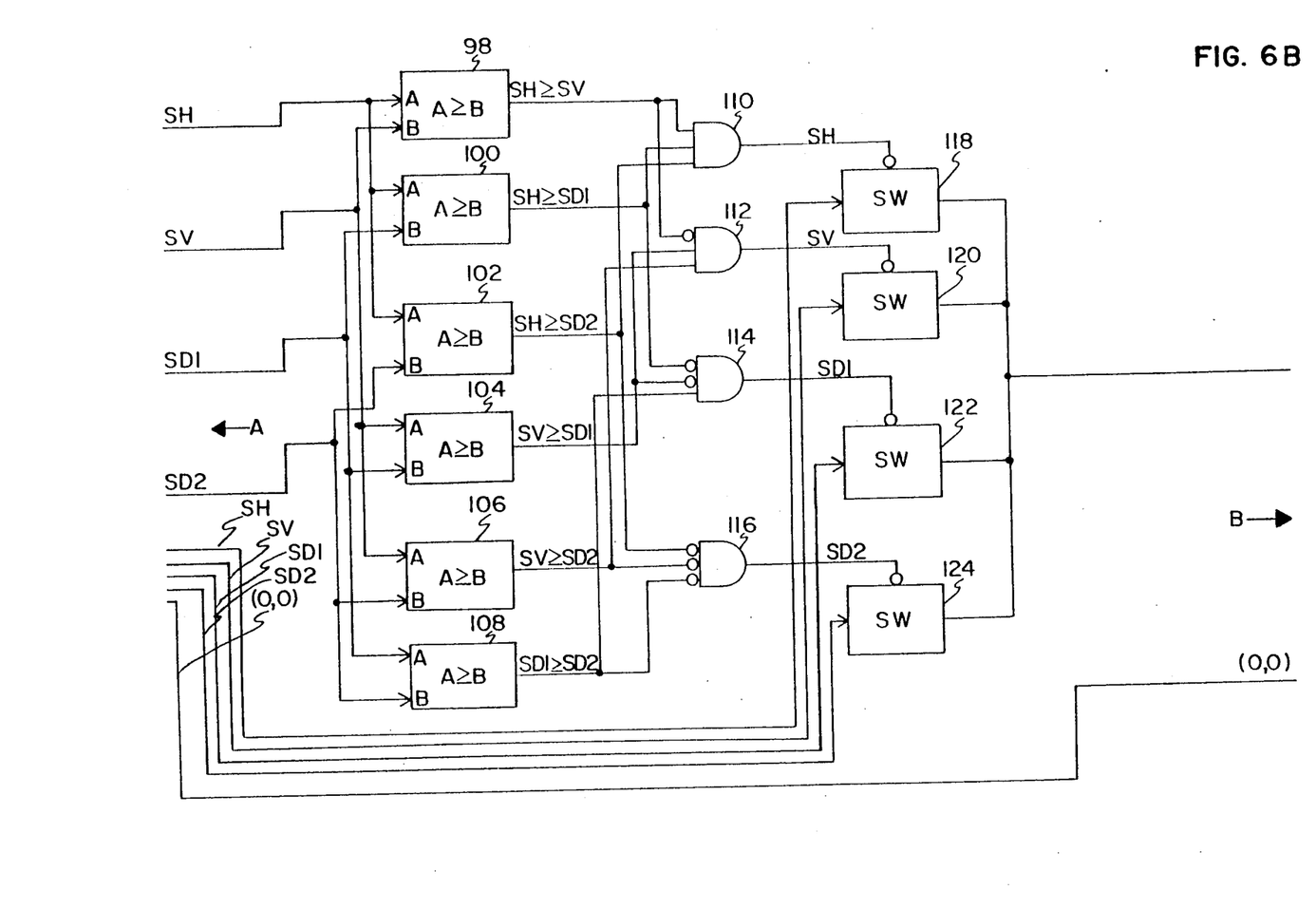
Figure 6C:
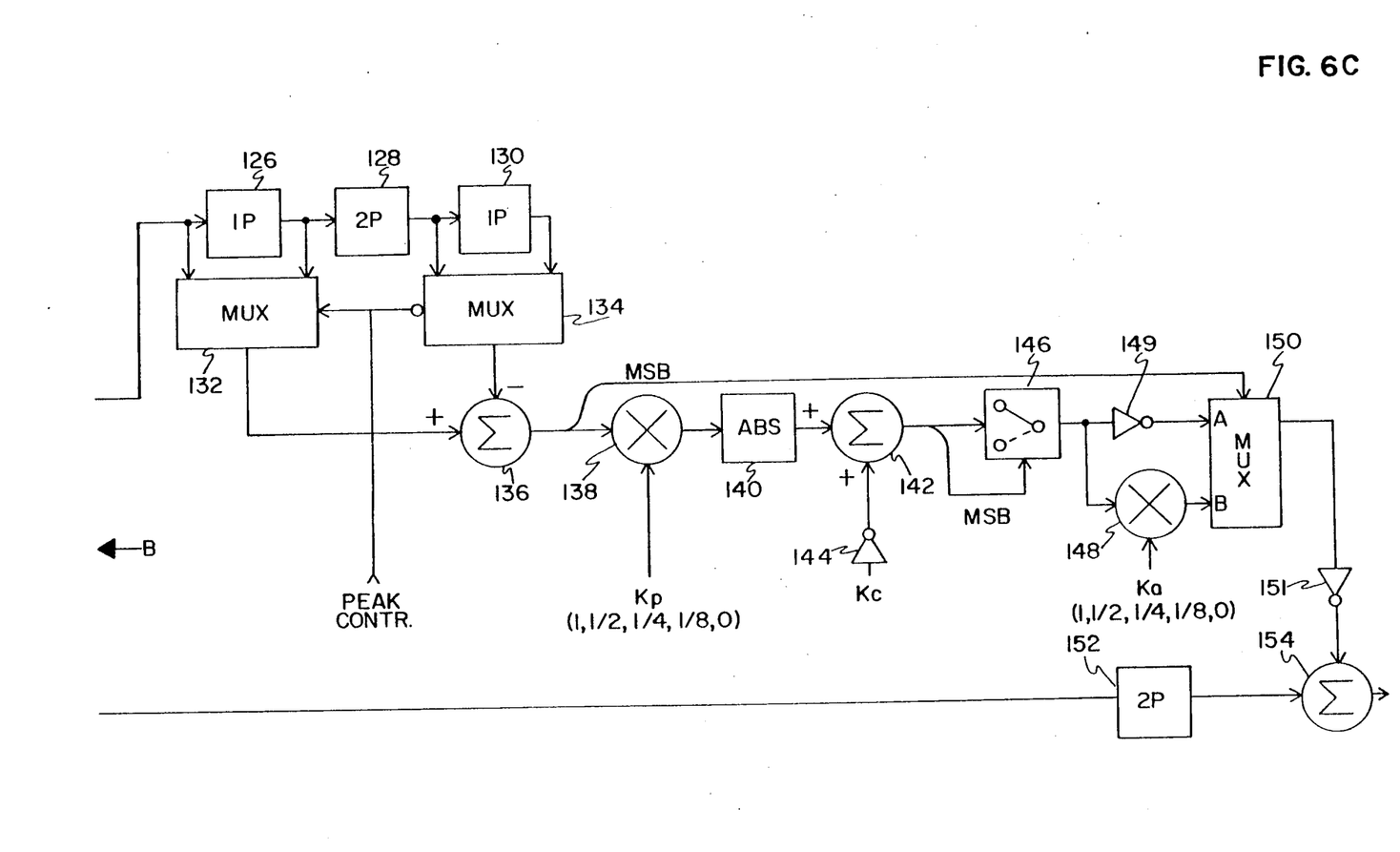
Figure 9:
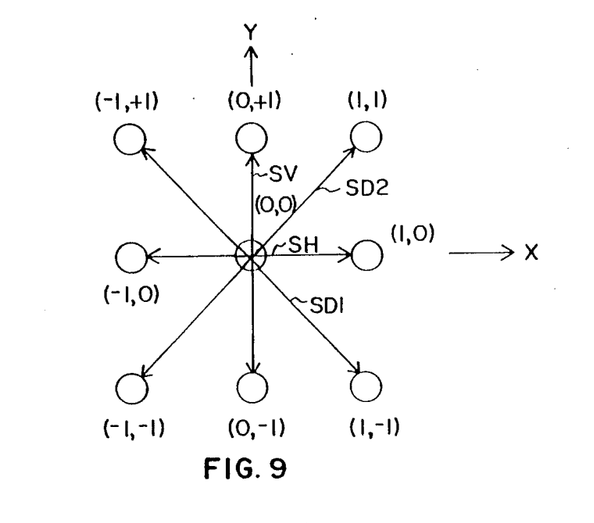
FIG. 9 represents an array of pixels used in the adaptive noise peaking portion of the invention.

In referring to FIGS. 6A, 6B and 6C, the figures should be aligned with the arrow heads A in FIGS. 6A and 6B touching and the arrow heads B in FIGS. 6B and 6C touching. FIG. 9 may also be referred to since it shows the spatial array and gradients calculated for the adaptive peaking circuit. The upper, center and lower video pixels from FIG. 4 are applied to 1P delay circuits 70, 74 and 78, respectively. The delay circuits 70, 74 and 78 in turn supply 1P delay circuits 72, 76 and 80, respectively. As will be seen, these 1P delay circuits develop a spatial array of pixels for peaking purposes, with the peaking being controlled as a function of the maximum difference between selected pixel pairs. The pixels in the spatial array are identified by standard XY coordinates in FIG. 9. The center line pixel signal is applied to a summer 82 along with the output of delay circuit 76, which is applied through an inverter 81. Therefore the digital value of pixel (1, 0) is subtracted from the digital value of pixel (−1, 0). The output of delay circuit 70 is coupled to a summer 84 along with the output of delay circuit 78, which is applied through an inverter 83. This results in subtracting pixel (0, −1) from pixel (0, 1). The output of delay circuit 72 is coupled to a summer 86 along with the lower line pixel signal L, which is applied through an inverter 85. This results in pixel (−1, −1) being subtracted from pixel (1, 1). Similarly, the upper pixel signal U is applied to a summer 88 along with the output of delay circuit 80, which is applied through an inverter 87 and results in pixel (1, −1) being subtracted from pixel (−1, 1). As indicated, the output of summer 82 is a difference SH, the output of summer 84 is a difference SV, the output of summer 86 is a difference SD1 and that from summer 88 is a difference SD2. These differences are applied, through absolute value circuits 90, 92, 94 and 96, respectively, to a corresponding plurality of comparators 98, 100, 102, 104, 106 and 108 in FIG. 6B. The outputs of the comparators are interconnected to the inputs of a plurality of AND gates 110, 112, 114 and 116 with the logic signal level polarities indicated. The AND gates comprise a maximum value decoder and the corresponding largest one of the four differences develops an output from its corresponding AND gate. Each comparator output controls a respective one of four tri-state switches 118, 120, 122 and 124, respectively. The switches are also supplied with the SH, SV, SD1 and SD2 differences. Only one of the tri-state switches 118, 120, 122 and 124 is operated at any given time (depending upon the largest of the differences SH, SV, SD1 and SD2). The tri-state switches become open circuits when they are not activated, i.e. closed to couple their input signals to their outputs. Thus the common output of the tri-state switches exhibits one of the differences SD, SH, SD1 and SD2 without interaction from the signals coupled to the deactivated switches. The common output connection of the tri-state switches is supplied to an integrater in FIG. 6C along with the output of delay circuit 74, which is pixel (0, 0). This pixel is seen to be the one that is being processed (whether it is real or interpolated).

The integrator is made up of a series connection of a 1P delay circuit 126, a 2P delay circuit 128 and a 1P delay circuit 130 and a pair of multiplexers 132 and 134. The outputs of the multiplexers 128 and 130 are applied to a summer 136 which develops an 8 bit signal in two's complement form with the most significant bit (MSB) indicating the polarity of the signal being applied to control operation of another multiplexer 150. The remaining bits of the output of summer 136 are applied to a multiplier 138 which is controllable by peaking factor Kp from microprocessor 36 (FIG. 5). The peaking factor Kp affects both polarities of the signal and therefore provides symmetrical peaking. The output of multiplier 138 is applied to an absolute value circuit 140, the output of which is applied to another summer 142 which receives a programmable coring factor Kc from microprocessor 36 through an inverter 144. The MSB of the output of summer 132 is used to control a switch 146 which connects the output of the summer 142 to a multiplier 148 and to an inverter 149, depending upon the polarity of the signal. The output of the inverter 149 supplies the A input of multiplexer 15 and the output of multiplier 148 supplies its B input. Another peaking factor Ka from microprocessor 36 is applied to control multiplier 148. As will be seen, this peaking factor Ka only affects one polarity of the signal and therefore provides asymmetrical peaking. The output of multiplexer 150 is applied through an inverter 161 to a summer 154 which is also supplied with the output of delay circuit 74 (FIG. 4A) through a 2P delay circuit 152. The resultant fully processed luma output pixel signal from summer 154 is passed to D/A converter 18 (FIG. 1).

Figure 7:
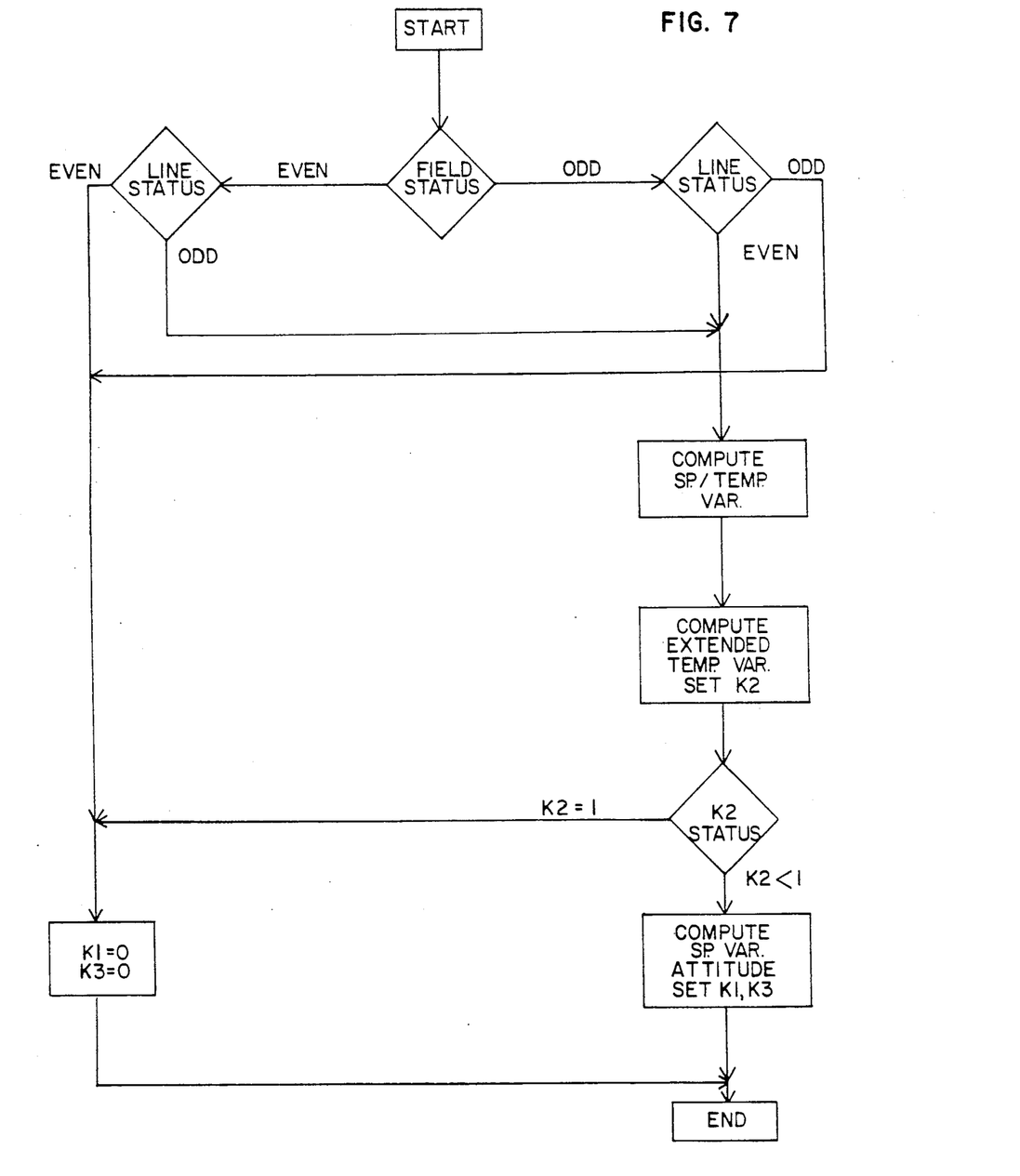
FIG. 7 is a flow chart explaining operation of the invention.
Figure 8:
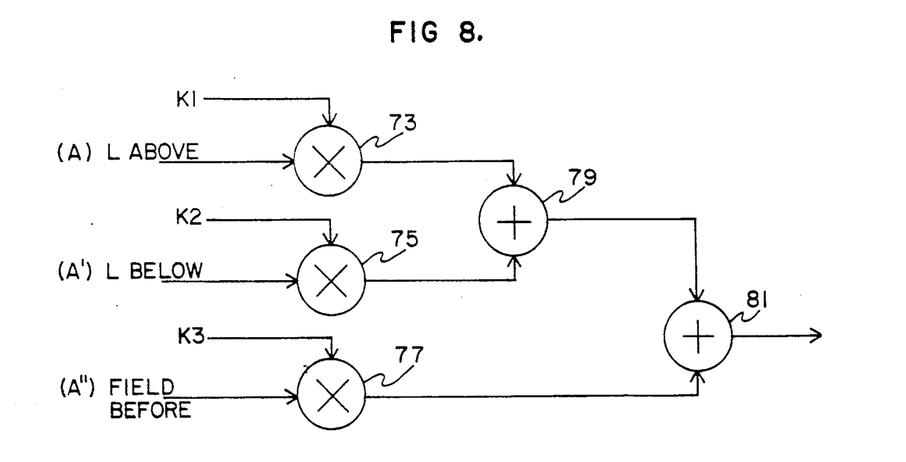
FIG. 8 illustrates the operation of the 3D interpolator.

The flow chart of FIG. 7 and the schematic of FIG. 8 illustrate operation of the system and the relationships of the video signals at junctions A, A' and A''.

The logic illustrates identification of the appropriate lines based upon even and odd fields and even and odd lines. The real lines are thus enabled to be processed without modification by the inter-polator. The "interpolated lines" are subjected to both spatial and temporal processing (using successive pairs of real lines) and extended temporal processing by comparison with the previous field line. To do this, the 3D interpolator 33 must have access to pixels of two successive lines and from the previous field. This is accomplished with 1H registers 17 and 19, 1H delay 23 and field delay 27. In order to utilize the extended temporal variation, a four-bit coefficient is developed for each pixel and stored in motion coefficient storage device 31. The comparison of the present and previous field motion coefficient determines the temporal correlation and therefore whether full temporal processing can be done. In practice 1 field delay 27 need only have a delay of 263 lines and motion coefficient storage device 31 needs a capacity of 262 lines. Junction A has successively appearing thereat lines 2—2, 4—4, 6—6, 8—8, etc. Junction A' has lines 2—2, 4—4, 6—6, 8—8, etc. that are delayed by one line from those at junction A. Junction A" on the other hand has lines 3, 5 and 7 from the previous field. At any time, there are three lines (three video pixels from different lines) available for the 3D interpolator 33 and the motion detector 29. As shown in FIG. 8, the 3D inter-polator has as inputs the signals from junctions A (the line above), A' (the line below) and A" (the field previous). These inputs are applied to three multipliers 73, 75, 77 with the multipliers each being controllable by one of the motion factors K1, K2 and K3, respectively. The output of multipliers 73, 75 and 77 are applied to an adder 79 and the output of multiplier 77 is combined with the output of adder 79 in an adder 81. The output of adder 81 constitutes the output of 3D interpolator 33 in FIG. 4.

As indicated by the flow diagram, the logic controls the proportioning of the interpolated video signal. Each video pixel is assigned a value that is subjected to a motion detection comparison with the value for its previous-field-stored motion coefficient and is then 3D interpolated. The new motion coefficient replaces the previous field coefficient in storage device 31 after the comparison. Thus the output of adder 81 consists of various proportions of the signals at junctions A, A' and A" as modified by motion factors K1, K2 and K3. As mentioned, the real video pixels in the signal are passed through 3D interpolator 33 (FIG. 4) without alteration because K1 and K3 are set to 0 for these signals. At any time, the summation of K1, K2 and K3 is equal to 1. Where significant motion is detected, K3 is equal to 0 and K1 and K2 are set to develop an average of the successive real lines A and A' where there is no motion. K3 is equal to 1 and K1 and K2 are 0. Obviously when K3 is 1 it represents full temporal processing and when K3 is 0 it represents full spatial processing. The system proportions among spatial and temporal as functions of K1, K2 and K3. It is only the interpolated video pixels that are determined based upon the motion detector and the motion coefficients. All pixels both real and interpolated are applied to the adaptive peaking circuit in FIG. 6A for further processing.

Operation of the adaptive peaking circuit of the invention will be best understood by reference to FIG. 6A, FIG. 6B and FIG. 9. The invention peaks a signal undergoing a large change but does not peak a signal undergoing no change. This obviates the undesirable effects of prior art circuits that apply peaking to signals of a certain magnitude. The adaptive peaking of the invention is based upon pixel gradients in a spatial area that embraces both past pixels and future pixels. Specifically, with reference to FIG. 9, a spatial group or cluster of eight pixels, covering three video lines, is developed and the differences between vertically, horizontally and diagonally displaced pairs of pixels in the cluster are derived. The pixel at the center of the cluster, that is on the middle or center line of the three lines embraced by the array identified as (0, 0) is the pixel being processed for display. Assuming left to right and top to bottom scanning, the previous pixel in the center line is identified as (1, 0) and the following pixel in that line is (−1, 0). Similarly, the pixels on the upper line, reading from left to right, are (−1, 1), (0, 1) and (1, 1). The pixels on the lower line of the cluster are identified as (−1, −1), (0, −1) and (1, −1). The horizontal gradient SH is developed by subtracting the pixels in locations (−1, 0) and (1, 0). The vertical gradient SD is obtained by calculating the difference between pixels (0, +1) and (0, −1). The gradient SD1 is obtained by the difference between the diagonally situated pixels (1, −1) and (−1, 1). The gradient SD2 is developed by calculating the difference between diagonally displaced pixels (1, 1) and (−1, −1). In FIG. 6A, the pixels are identified at the inputs and outputs of the 1P delay circuits. Their application to the summers 82, 84, 86 and 88 produce the gradients SH, SV, SD1 and SD2 as shown. These gradients are developed in absolute value form at the output of the absolute value circuits 90, 92, 94 and 96.

In FIG. 6B the absolute values of these gradients are applied to a gradient differentiator arrangement comprising the comparators 98, 100, 102, 104, 106 and 108. Their outputs are applied to a maximum decoder consisting of AND gates 110, 112, 114 and 116. The result is that the largest of the gradients SH, SV, SD1 and SD2 controls operation of the corresponding one of the tri-state switches 118, 120, 122 and 124 to produce the largest gradient at its common output, which is not an absolute value, but rather exhibits a polarity characteristic.

The arrangement determines the largest gradient among vertically, horizontally and diagonally displaced pairs of pixels in the cluster. That gradient is passed to the integrator circuit in FIG. 6C consisting of the pixel delay circuits 126, 128 and 130 and the multiplexer circuits 132 and 134. The integrator precludes noise effects and artifacts which may result from peaking signals of extremely short duration. A peaking control, which may be selectively controlled by the viewer functions as a noise suppressor. It is preferably set to peak only for signals over about 2 MHz. Also peaking determinations are made by averaging signals over a number of pixels rather than over one or two pixels. That is the function of the integrator which slows down the response of the peaking arrangement. The output of summer 136 is an 8 bit luma signal in two's complement form. The most significant bit is used to control multiplexer 150. Noise coring and peaking, both symmetrical and asymmetrical, are performed by the remaining circuitry.

Figure 10A:
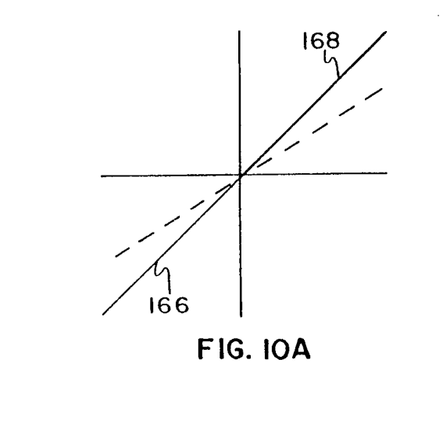
FIGS. 10A-10D are waveforms illustrating, noise coring and symmetrical and asymmetrical peaking of the peaked component in accordance with the invention.
Figure 10B:
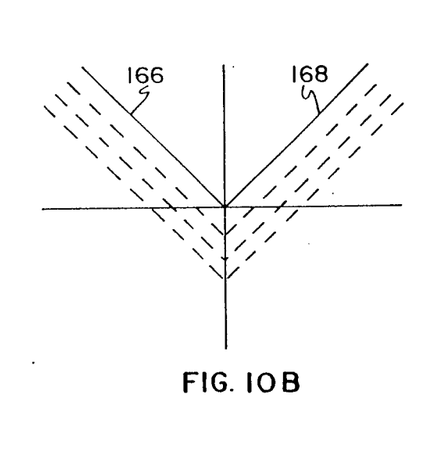
Figure 10C:
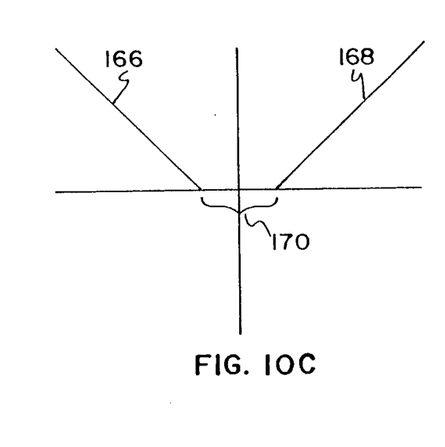
Figure 10D:
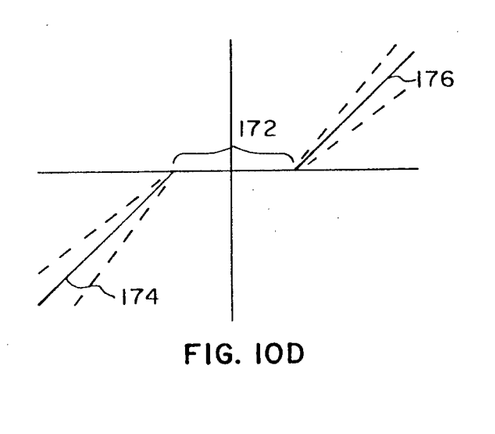

A multiplier 138 is controlled by a peaking factor Kp which, in the preferred embodiment, may be set in the indicated increments between one and zero. As indicated by the waveform in FIG. 10A, the slope of portions 166 and 168 are varied simultaneously over the range indicated by the dashed line by selection of the peaking factor Kp which operates symmetrically. The output of multiplier 138 is supplied to an absolute value circuit 140 which results in a waveform corresponding to FIG. 10B where portion 166 is now positive. The coring factor Kc supplied from inverter 144 to summer 142 effectively removes the center portion of the waveform, such that the segments 166 and 168 are shifted vertically downward as indicated by the dashed lines. As shown in FIG. 10C, the segments 166 and 168 go to zero for a portion 170 which represents the cored section. The coring waveform applied to switch 146 is controlled by the most significant bit, i.e. the polarity of the signal. When the signal is negative the switch 146 is open and when the signal is positive switch 146 is closed. The coring waveform, as illustrated in FIG. 10C, is obtained at the output of switch 146. The representation of that waveform at the A input of multiplexer 150 is multiplexed with a multiplied version of the waveform at the B input of multiplexer 150. The multiplier 148 is controlled by the asymmetrical peaking factor Ka which may also be incremented between the limits of zero and one. The most significant bit of the original gradient controls operation of multiplexer 150 so that when the gradient is positive the B input of multiplexer 150 is selected and when it is negative the A input is selected. The output coring waveform is inverted by inverter 151 and passed to summer 154 where it is combined with the interpolated pixel (0, 0) which has been delayed by two pixels. The output is a fully processed pixel which is supplied to the D/A converter to reconvert the signal to analog form. The adaptive peaking and noise coring is applied to all displayed pixels, real and interpolated. As shown in FIG. 10D, the pixel is peaked and noise cored with independent control of the negative and positive portions of the peaking and independent control of the portions to be noise cored. This is accomplished in a relatively simple hardware circuit which constitutes another aspect of the invention.

The above described circuit is concerned specifically with the luma signal. However, similar techniques may be applied for chroma signal processing. The result of the video processing circuits of the invention is a scan converter that develops interpolated video as a function of motion and previous motion determinations. The remaining circuitry provides individual control of the peaking of each pixel in the video signal based upon its present value, the past value for that pixel location and the future value of that pixel location. With the inventions, crisp, noise free displays from NTSC signals may be obtained.

What is claimed is:

1. A method of developing a progressive scan display from a video signal having two interlaced fields of line video comprising:

making available video signals from successive lines in one field and a corresponding line in a previous field;

detecting motion from said video signals;

developing a motion detection coefficient indicative of the motion determination of the video signal in said previous field;

developing a motion factor from said motion detection coefficient; and developing an interpolated video signal from said video signals and said motion factor.

2. The method of claim 1 wherein said motion factor determines the composition of said interpolated video signal by varying the proportions of said video signals.

3. A scanned video system comprising:

means for processing video information in two interlaced fields for display as successive lines of video;

means for processing said video information in adjacent lines in one of said interlaced fields including means for repeating successive lines of said video information;

means for processing said video information in a corresponding line in the other of said interlaced fields including means for delaying said video information by one field;

means for storing motion data corresponding to video information in said delayed field;

motion detecting means for detecting motion in said video information and for producing a motion indication signal in response thereto;

means for supplying said motion data to said motion detecting means; and means for outputting interpolated video information by proportioning said video information in adjacent lines and said video information in said corresponding line as a function of said motion indication signal.

4. The method of operating a video information scanning system of the interlaced field type comprising:

developing video signals comprising a pair of successive real lines of video pixels in a field and a corresponding line of video pixels from a previous field;

determining motion indicating parameters for video pixels in said previous field and for a selected video pixel being processed;

determining the amount of motion indicated by said video pixels;

comparing said motion indicating parameter for said selected video pixel with the corresponding motion indicating parameter for the corresponding video pixel in the previous field;

modifying said indicated motion by said comparison; and proportioning an interpolated video signal from said video signals as a function of said indicated motion.

* * * * *